W. W. DAVIS & J. H. JEFFREY.
STALK CUTTER.
APPLICATION FILED JUNE 19, 1909.
951,678.
Patented Mar. 8, 1910.
2 SHEETS—SHEET 2.
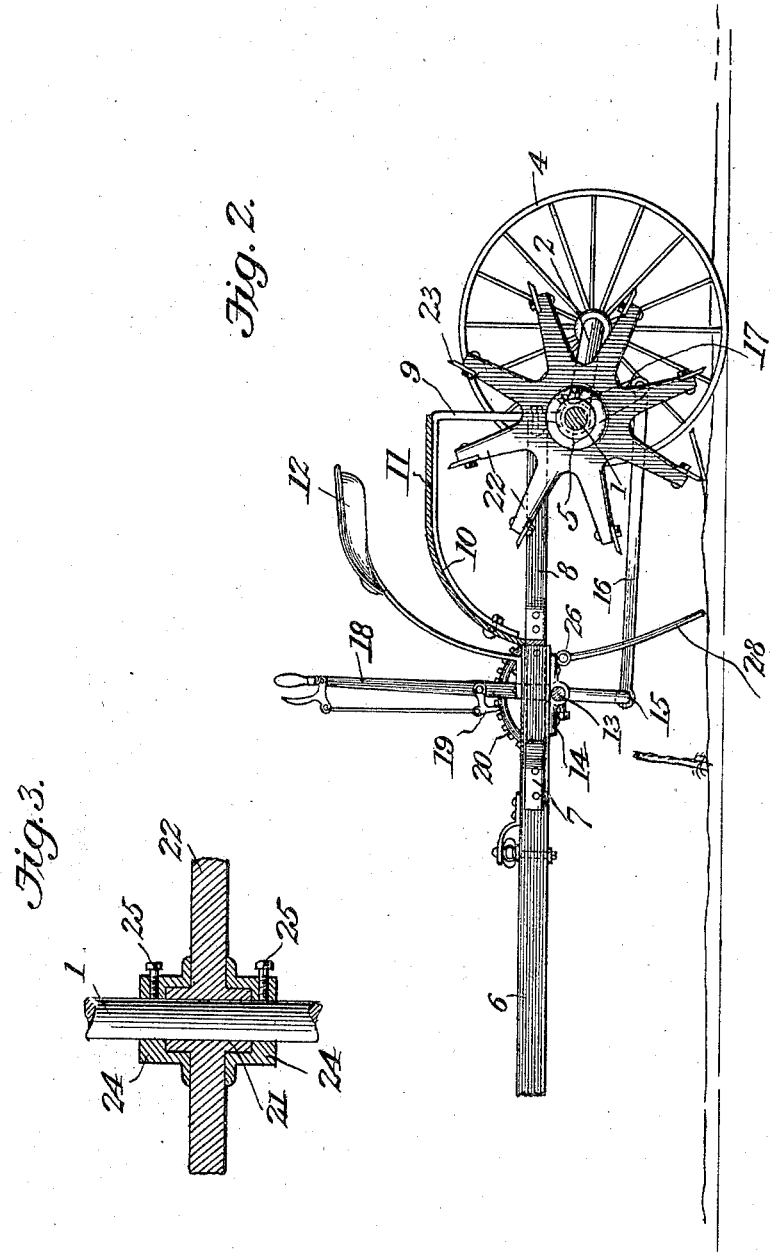
Witnesses
Fenton S. Belt.
U. B. Hillyard.
Inventors:
Walter W. Davis and
Joseph H. Jeffrey
By Victor J. Evans
Attorney.

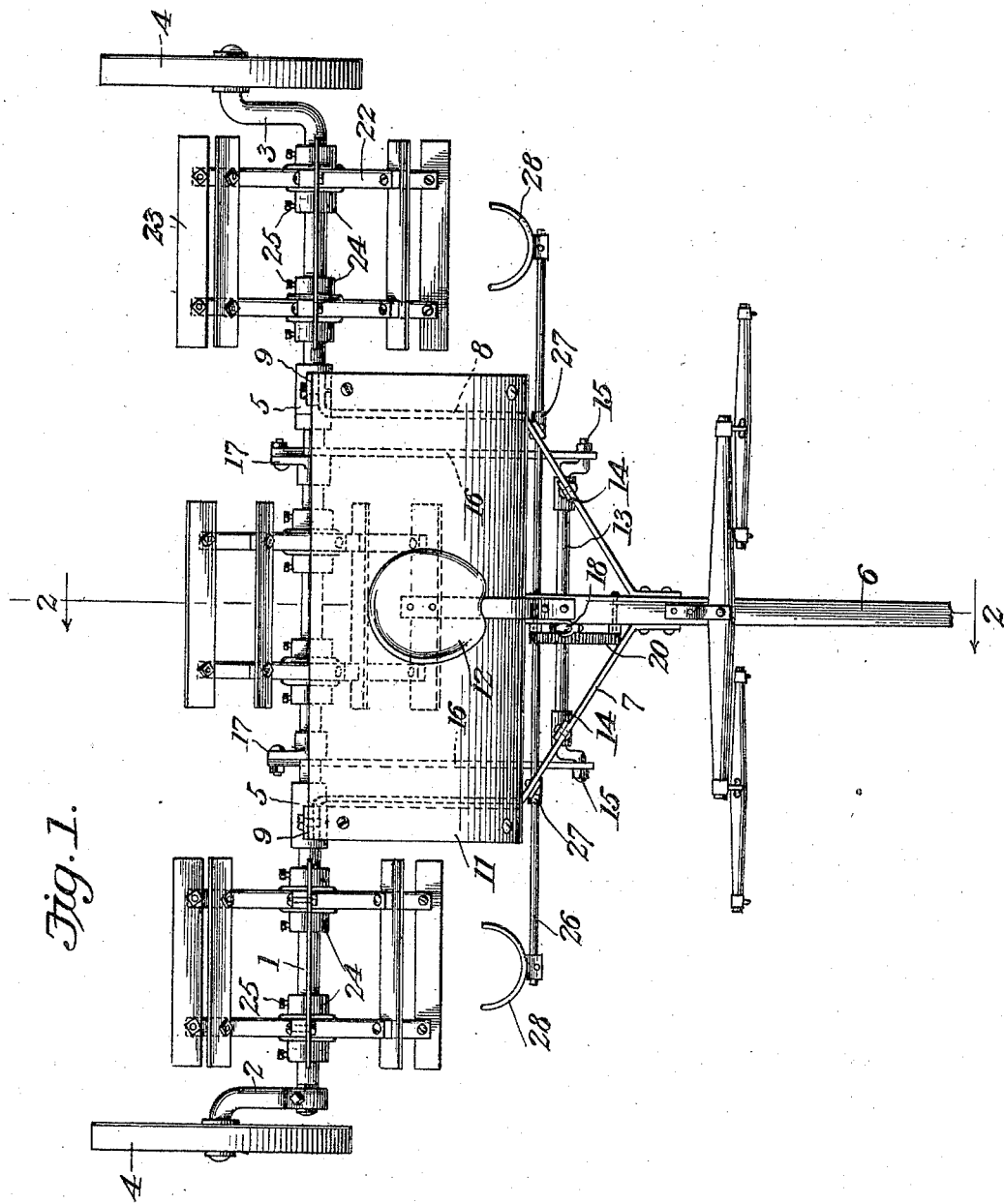

UNITED STATES PATENT OFFICE.

WALTER W. DAVIS AND JOSEPH H. JEFFREY, OF ROTAN, TEXAS.

STALK-CUTTER.

951,678. Specification of Letters Patent. Patented Mar. 8, 1910.

Application filed June 19, 1909. Serial No. 503,148.

*To all whom it may concern:*

Be it known that we, WALTER W. DAVIS and JOSEPH H. JEFFREY, citizens of the United States, residing at Rotan, in the county of Fisher and State of Texas, have invented new and useful Improvements in Stalk-Cutters, of which the following is a specification.

The present invention appertains to agricultural implements and more particularly to machines for use in the field for chopping stalks after the harvest has been reaped so as to prepare the same for fertilizing.

The purpose of the invention is to devise a stalk chopper capable of being adjusted and easily manipulated for effecting the desired results in a positive and satisfactory manner, said machine involving a minimum number of operating parts and capable of being maintained in working condition with a minimum expenditure of time and cost.

The invention consists of the novel features, details of construction and combinations of parts which hereinafter will be more particularly set forth, illustrated in the accompanying drawings and pointed out in the appended claim.

Referring to the drawings forming a part of the specifications: Figure 1 is a top plan view of a stalk cutter embodying the invention. Fig. 2 is a vertical longitudinal section on the line 2—2 of Fig. 1 looking in the direction of the arrows. Fig. 3 is a detail view of a portion of the axle showing the manner of mounting the rotary cutters thereon.

Corresponding and like parts are referred to in the following description and indicated in all the views of the drawings by the same reference characters.

The implement comprises an axle 1 having crank arms 2 and 3 at opposite ends upon which the ground wheels 4 are loosely mounted. One of the crank arms as 3 is preferably a part of the axle 1 bent into the shaft substantially as shown. The crank arm 2 is removably fitted upon the opposite end of the axle thereby admitting of slipping the axle into its bearings as well as placing the cutters and other parts thereon. The axle 1 is mounted in bearings 5 so as to turn and thereby admit of adjusting the cutting mechanism vertically to meet varying conditions of soil and work.

The frame-work of the machine or implement comprises a pole or tongue 6, hounds 7, longitudinal bars 8, vertical bars 9, and upper curved bars 10, the latter supporting a shelf 11 which affords protection for the driver when mounted upon the seat 12 which is supported by means of a standard upon the rear portion of the pole or tongue 6. A transverse shaft 13 is mounted in bearings 14 secured to the hounds 7 and to the pole or tongue 6 and is provided at its ends with crank arms 15 which are connected by rods or bars 16 with crank arms 17 fast to the axle 1. Upon turning the shaft 13, the axle 1 is correspondingly turned by means of the connections 15, 16 and 17 thereby raising or lowering the frame-work and the axle together with the cutters mounted thereon. For convenience of operating the shaft 13, a hand lever 18 is provided, the same being secured at its lower end to the shaft 13 and provided with a hand latch 19 to coöperate with the teeth of a notched bar or segment 20 so as to hold the shaft 13 and cutting mechanism in the required adjusted position. The operating lever 18 extends within convenient reach of the driver's seat 12.

The cutting mechanism is mounted upon the axle 1 and there may be as many cutters as desired, three being shown and each being of like construction and mounting. The cutters are of the rotary type and each consists of a hub 21 and a series of arms 22 radiating from the hub and supporting blades 23 at their outer ends. A pair of armed supports are provided for each cutter and are loosely mounted upon the axle so as to rotate freely thereon. To prevent longitudinal movement of the cutters upon the axle, cap pieces 24 are slipped upon the axle and are secured thereon by means of set-screws 25 threaded into openings thereof. A pair of cap pieces 24 are supplied for each armed support of the cutters and are arranged upon opposite sides of the hub so as to inclose the same as indicated most clearly in Fig. 3 thereby excluding dirt and preventing grinding or rapid wear of the rotating parts.

A rod or bar 26 extends transversely of the implement in advance of the cutting mechanism and is mounted fast in bearings 27 attached to the frame-work. Forked drags 28 are mounted upon end portions of the rod or bar 26 and are arranged in line with the outermost rotary cutters so as to incline the stalks in advance of the cutters whereby they are enabled the better to chop the stalks.

From the foregoing taken in connection with the accompanying drawings it will be understood that the parts are constructed with a view to enable them to be easily and quickly assembled or dismembered when required for any purpose such as cleaning or to replace broken or disabled parts. It is also noted that the rotary cutters may be adjusted upon the axle to any relative position or distance apart to meet varying conditions and that the relatively movable parts are protected so as to exclude dust and foreign matter and prevent rapid wear of the parts. It is further noted that the cutting mechanism is at all times under control of the driver so as to be raised or lowered as occasion may require.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claim appended hereto.

Having thus described the invention, what is claimed is—

The herein described stalk cutter comprising a frame-work, an axle mounted upon the frame-work and provided with crank arms, one of which is detachable, ground wheels mounted upon said crank arms, rotary cutters mounted upon the axle to turn freely thereon and relatively adjustable, a shaft mounted upon the frame-work parallel with the axle and provided with crank arms, other crank arms fast to the axle, connecting means between the crank arms of the shaft and axle, an operating lever fast to said shaft and turning the same to effect vertical adjustment of the cutting mechanism, means for securing the parts in adjusted position, and a bar located in advance of the axle and provided with forked drags.

In testimony whereof, we affix our signatures in presence of two witnesses.

WALTER W. DAVIS.
JOSEPH H. JEFFREY.

Witnesses:
G. L. GOOCH,
R. P. DUNN.